United States Patent
Mitsugi (10) Patent No.: US 11,686,811 B2
(45) Date of Patent: Jun. 27, 2023

(54) HIGH-FREQUENCY MODULE

(71) Applicant: YOKOWO CO., LTD., Tokyo (JP)

(72) Inventor: Kenichi Mitsugi, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 555 days.

(21) Appl. No.: 16/648,671

(22) PCT Filed: Aug. 6, 2018

(86) PCT No.: PCT/JP2018/029420
§ 371 (c)(1),
(2) Date: Mar. 19, 2020

(87) PCT Pub. No.: WO2019/073677
PCT Pub. Date: Apr. 18, 2019

(65) Prior Publication Data
US 2020/0256946 A1    Aug. 13, 2020

(30) Foreign Application Priority Data

Oct. 13, 2017   (JP) .................................. 2017-199460

(51) Int. Cl.
*G01S 7/03* (2006.01)
*G01S 13/58* (2006.01)
(Continued)

(52) U.S. Cl.
CPC ............ *G01S 7/032* (2013.01); *G01S 13/583* (2013.01); *G01S 13/62* (2013.01); *H01P 1/2039* (2013.01); *H01Q 23/00* (2013.01)

(58) Field of Classification Search
CPC ........ G01S 7/032; G01S 13/583; G01S 13/62; H01P 1/2039; H01Q 23/00
See application file for complete search history.

(56) References Cited

U.S. PATENT DOCUMENTS 5,986,600 A  * 11/1999  McEwan ................. G01S 13/56
                                                                342/28
8,212,718 B2    7/2012  Utagawa
(Continued)

FOREIGN PATENT DOCUMENTS

JP    2001-16042 A    1/2001
JP    2003-194918 A   7/2003
(Continued)

OTHER PUBLICATIONS

Office Action dated Mar. 29, 2022, in corresponding Japanese patent Application No. 2019-547930, 8 pages.
(Continued)

*Primary Examiner* — Peter M Bythrow
*Assistant Examiner* — Nazra Nur Waheed
(74) *Attorney, Agent, or Firm* — Xsensus LLP (57) ABSTRACT

A high-frequency module with a simple configuration and facilitates size reduction and mass production is provided. An oscillator that includes a bipolar transistor, an antenna, and mixers are realized as one circuit. A base of the bipolar transistor is electrically connected to a resonance pattern or the like that outputs a signal at a frequency in a quasi-millimeter wave band or higher by direct oscillation. A collector is electrically connected to a transmission line or the like which is connected to a power source. An emitter is electrically connected to a planar open transmission line or the like that operates as an antenna. A portion of the signal transmitted through the open transmission line is fed back to the base via a capacitance between the open transmission line and the base. The open transmission line is electrically connected to two diodes and each of which operates as a mixer.

15 Claims, 7 Drawing Sheets

(51) Int. Cl.
*G01S 13/62* (2006.01)
*H01P 1/203* (2006.01)
*H01Q 23/00* (2006.01)

(56) References Cited

U.S. PATENT DOCUMENTS

2010/0052799 A1   3/2010   Watanabe et al.
2010/0117891 A1*  5/2010   Utagawa .............. H03B 5/1852
                                                         342/175

FOREIGN PATENT DOCUMENTS

| JP | 2004-85293 A | 3/2004 |
| JP | 2004-212178 A | 7/2004 |
| JP | 2016-146550 A | 8/2016 |
| WO | 2008/120826 A1 | 10/2008 |

OTHER PUBLICATIONS

International Search Report and Written Opinion dated Sep. 11, 2018 for PCT/JP2018/029420 filed on Aug. 6, 2018, 7 pages including English Translation of the International Search Report.

* cited by examiner

|  | REFLECTION TYPE | FEEDBACK TYPE |
|---|---|---|
| CIRCUIT CONFIGURATION | STRIPLINE + RESONANCE ELEMENT + OSCILLATION ELEMENT | |
| OSCILLATION ELEMENT GAIN | AROUND 1 ADEQUATE | 1 OR MORE REQUESTED |
| NOISE | LARGE | SMALL |
| OUTPUT | SMALL | LARGE |

FIG. 5

|  | BIPOLAR TRNSISTOR | FET | HEMT |
|---|---|---|---|
| NUMBER OF TERMINAL | 3 OR 4 | 4 | 4 |
| OSCILLATION METHOD | MULTIPLICATION | DIRECT OSCILLATION | DIRECT OSCILLATION |
| BIAS | POSITIVE | POSITIVE AND NEGATIVE | POSITIVE AND NEGATIVE |
| STABILITY | HIGH | INTERMEDIATE | LOW |
| INTER-TERMINAL CAPACITANCE | HIGH | INTERMEDIATE | LOW |
| $f_T$ | LOW | INTERMEDIATE | HIGH |
| CURRENT CONSUMPTION | INTERMEDIATE | LOW | HIGH |
| PRICE | LOW | INTERMEDIATE | HIGH |

HIGH-FREQUENCY MODULE

CROSS-REFERENCE TO RELATED APPLICATIONS

The present application is based on PCT filing PCT/JP2018/029420, filed Aug. 6, 2018, which claims priority to JP 2017-199460, filed Oct. 13, 2017, the entire contents of each are incorporated herein by reference.

TECHNICAL FIELD

The present invention relates to a micro small-sized high-frequency module which is usable for a transistor oscillator in a quasi-millimeter wave band, a radio wave sensor that detects movement of an object, and the like.

BACKGROUND ART

In recent years, multi-functionality of apparatus such as automatic opening and closing of a door, automatic switching ON/OFF of an electrical apparatus, and automatic lighting and tuning-off of illumination have been progressing. Further, development of watching sensors that watch safe living of people, security sensors that sense a suspicious person or the like, and the like has been progressing. Those apparatus and sensors use a radio wave sensor that detects movement of an object by a radio wave.

In relation to such kinds of radio wave sensors, Patent Literature 1 discloses a direction discrimination type Doppler module that may certainly recognize distance information of an object even if mixing units and the like are arranged regardless of the phases of local oscillation signals and reception signal to be input to two mixing units. In this Doppler module, two mixing units, each of which mixes the local oscillation signals and the reception signal as a reflected wave, are connected together in series. A first local oscillation signal and the reception signal are input to one of the mixing units, a second oscillation signal is further input to a connection portion of the two mixing units, the output of each of the mixing units is detected, and the distance information that the object moves away or closer is thereby detected.

Further, Patent Literature 2 discloses a radio sensor module with a simple circuit configuration, which may transmit a high frequency and be reasonably manufactured. This radio sensor module is configured to include multiplication and wave-detection means that multiplies a reference radio wave, radiates a multiplied output radio wave from an antenna, and performs homodyne detection of an input radio wave which is reflected by a target and to which a time delay occurs.

Further, Patent Literature 3 discloses a Doppler radar that includes a local oscillator configured with microstriplines, an oscillation element as a non-linear element, and a varactor diode. As for the local oscillator, a portion of a signal of a main oscillator as an oscillation source is introduced from an external portion into an input end, an RF (high frequency) reception signal is thereafter input from the input end in a phase synchronization state between the signal of the main oscillator and a local oscillation signal. Accordingly, the oscillation element is caused to operate also as a mixer (mixing unit or mixing circuit), and an intermediate frequency signal is extracted from an output end.

CITATION LIST

Patent Literature

Patent Literature 1
  Japanese Patent Laid-Open No. 2004-85293
Patent Literature 2
  Japanese Patent Laid-Open No. 2003-194918
Patent Literature 3
  Japanese Patent Laid-Open No. 2001-16042

SUMMARY OF INVENTION

Technical Problem

In a Doppler module disclosed in Patent Literature 1, because mixers are shared for outputs of the mixers and signal inputs, matching is not easy. Further, because an oscillator and an antenna are provided as separate units, the whole Doppler module requests a large area, and size reduction is limited.

Further, because an oscillator of a radio wave sensor module disclosed in Patent Literature 2 uses a multiplication method and creates a large amount of spurious emissions, a strong filter is requested. Thus, size reduction is limited.

Further, because a Doppler radar disclosed in Patent Literature 3 uses expensive elements such as a circulator and a field effect transistor (FET), it is difficult to expect cost reduction.

An object of the present invention is to provide a high-frequency module that has a simpler configuration than the related art, facilitates size reduction and mass production, and also enables further cost reduction.

Solution to Problem

One aspect of the present invention provides a high-frequency module including: a transistor that has a first terminal, a second terminal, and a third terminal; a resonance pattern which is connected to the first terminal and outputs a signal at a frequency in a quasi-millimeter wave band or higher by direct oscillation; and a planar open transmission line which is connected to the second terminal and operates as an antenna capable of transmission and/or reception of a signal at the frequency, in which an inter-terminal capacitance between the first terminal and the second terminal is relatively larger than an inter-terminal capacitance between the first terminal and the third terminal and an inter-terminal capacitance between the second terminal and the third terminal, and a portion of the signal which is transmitted through the open transmission line in a case where a power source is supplied to the third terminal is fed back to the first terminal via a capacitance between the first terminal and the second terminal.

Advantageous Effects of Invention

In one aspect of the present invention, because a transistor produces a signal in a quasi-millimeter wave band by direct oscillation and the signal is radiated from an open transmission line, a circuit requested in constituting oscillation in a multiplication method, a filter for removing spurious emissions, and the like are not requested, a simple, small-sized, and reasonable high-frequency module may be provided.

DESCRIPTION OF EMBODIMENT

A description will hereinafter be made about an embodiment in a case where the present invention is applied to a high-frequency module that operates as a Doppler module (radio wave sensor) for detecting movement of an object by using the Doppler effect of a radio wave in a quasi-millimeter wave band. A Doppler module has an oscillator, an antenna, and a mixer as standard components. In a Doppler module in the related art that operates in a quasi-millimeter wave band, wiring is routed by providing those components as separate units and using two antennas. Further, although the reason will be described later, as well as a product of the applicant of this application, electronic elements used for an oscillator are expensive, and a configuration of a mixer is complicated. In this embodiment, reasonable electronic elements are used as those components and are integrated as one electronic circuit, and a high-frequency module is thereby realized which is considerably smaller in size and made at a lower cost than the related art.

Figure 1A:
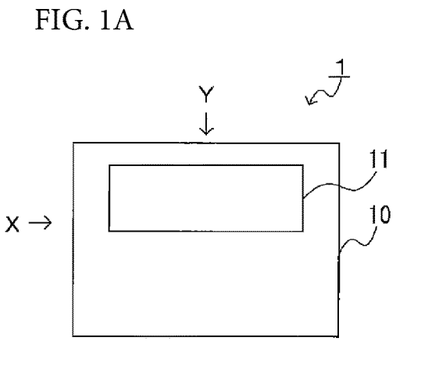
FIG. 1A is an external view and a top view of a high-frequency module of this embodiment.
Figure 1B:
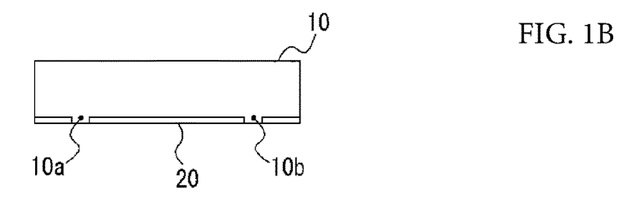
FIG. 1B is an external view of the high-frequency module of this embodiment and is a side view as seen from a Y direction.
Figure 1C:
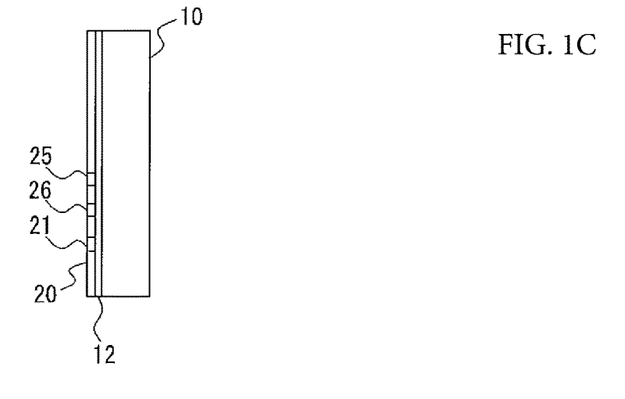
FIG. 1C is an external view of the high-frequency module of this embodiment and is a side view as seen from an X direction.

FIG. 1A to FIG. 1D are external views of the high-frequency module of this embodiment. FIG. 1A is a top view, FIG. 1B is a side view as seen from a Y direction, FIG. 1C is a side view as seen from an X direction, and Figure D is a rear view.

Figure 1D:
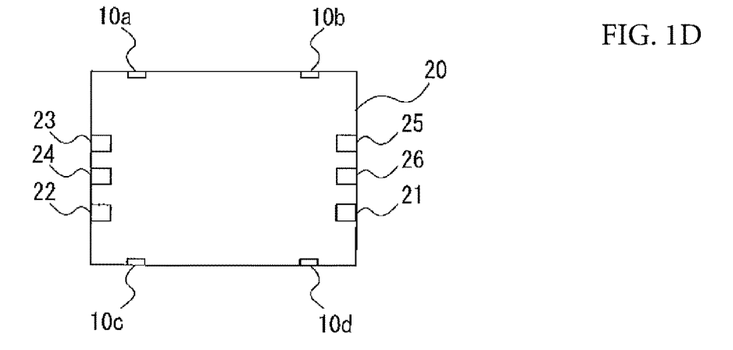
FIG. 1D is an external view and a rear view of the high-frequency module of this embodiment.

A high-frequency module 1 has a metal casing 10 for shielding and a substrate 20 onto a front surface side of which the metal casing 10 is fitted. The substrate 20 is a generally rectangular insulator, metal terminals 21 to 26 are formed in one pair of opposed short side surfaces and from the front surface to a rear surface, and four recesses are formed in one pair of long side surfaces. Because the terminals 21 to 26 are exposed on the rear surface as illustrated in FIG. 1D, wiring for power supply and signal output is easy.

The metal casing 10 has a shape of a rectangular tube with a bottom, and a window 11 opens through the bottom. A function of the window 11 will be described later. One pair of opposed short side surfaces of side surfaces of the metal casing 10 is shorter than one pair of opposed long side surfaces, a gap 12 is formed when the metal casing 10 is fitted onto the substrate 20, and contact with the terminals 21 to 26 is thereby avoided. Tongues 10a to 10d to be engaged with the above recesses of the substrate 20 are formed in the pair of long side surfaces of the metal casing 10.

In a case where the metal casing 10 is fitted onto the substrate 20, this assembly has a shape of a generally rectangular parallelepiped, as a whole, having dimensions of a vertical length of 13 mm, a horizontal length of 16 mm, and a thickness of 1.6 mm. Those sizes correspond to 20% or lower as a volume ratio compared to a related art product of the applicant of this application, which uses the same frequency and has antennas as separate units (that is, does not include antennas). A product that achieves such size reduction may not be found at the present time even among products of other companies.

Figure 2:
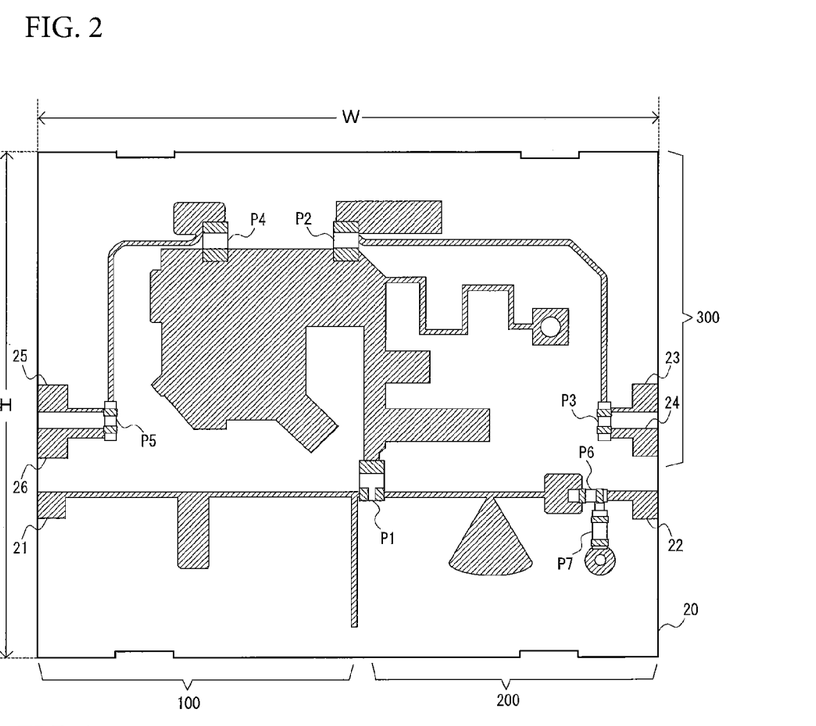
FIG. 2 is an exemplification diagram of a substrate layout.

Plural conductive film patterns are formed on the front surface of the substrate 20. FIG. 2 is an exemplification diagram of a substrate layout. The substrate 20 is a substrate in which a high-frequency substrate with a horizontal length W of 16 mm, a vertical length H of 13 mm, a thickness of 0.6 mm, and a dielectric constant of 3.2 and a general-purpose substrate with a horizontal length W of 16 mm, a vertical length H of 13 mm, a thickness of 0.3 mm, and a dielectric constant of 4.3 are attached together. The substrate 20 is provided with an increased thickness and strength by attachment of the general-purpose substrate and may be configured at a lower cost than a multi-layer structure of the high-frequency substrate.

Mounting portions P1 to P7 for performing surface-mount of electronic elements are formed on the substrate 20. A three-terminal transistor, for example, a bipolar transistor that has a base, a collector, and an emitter is mounted on the mounting portion P1. In this specification, a conductive film pattern between a joint part of the base of the mounting portion P1 and the terminal 21 will be referred to as a first conductive film pattern 100. Further, a conductive film pattern between a joint part of the collector of the mounting portion P1 and the terminal 22 will be referred to as a second conductive film pattern 200. Further, a conductive film pattern between a joint part of an emitter of the mounting portion P1 and the terminals 23 to 26 will be referred to as a third conductive film pattern 300.

Figure 3:
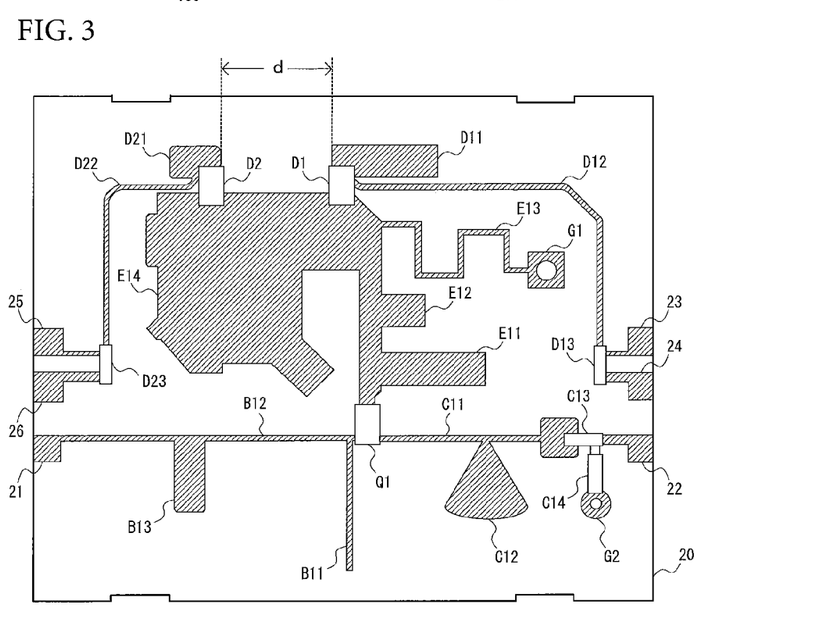
FIG. 3 is a state explanation diagram of a substrate, on which conductive film patterns are mounted and elements are mounted on mounting portions.
Figure 4:
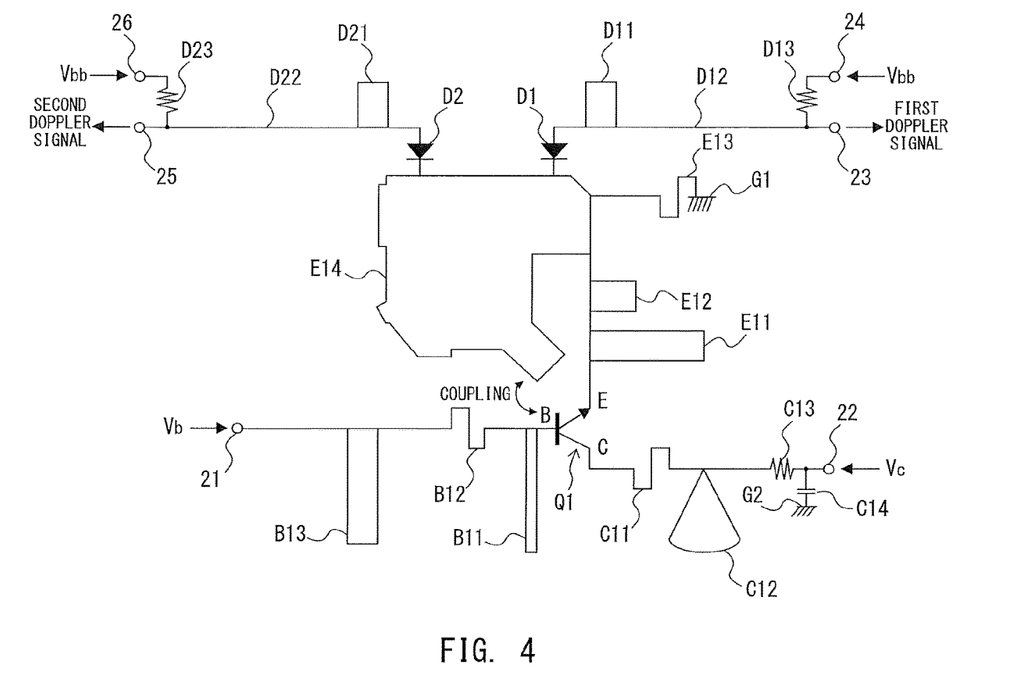
FIG. 4 is a schematic diagram of an electronic circuit realized with the conductive film patterns and the elements.

FIG. 3 illustrates a state of the substrate 20 on which individual conductive film patterns included in the conductive film patterns 100, 200, and 300 are mounted and elements are mounted on the mounting portions P1 to P7. Further, FIG. 4 is a schematic diagram of an electronic circuit which is realized with elements electrically connected to any of the conductive film patterns 100, 200, and 300 formed on the substrate 20.

An NPN type bipolar transistor Q1 is mounted on the mounting portion P1. Although an arbitrary mounting form may be employed, surface-mount is performed in this embodiment. A base B of the bipolar transistor Q1 is electrically connected to a resonance pattern B11 as the first conductive film pattern 100, a transmission line B12 with a predetermined length, an open stub B13, and the terminal 21. The resonance pattern B11 is a planar pattern with a length of approximately ¼ or approximately ⅜ of a wavelength λ of a 24 GHz band (for example, 24.15 GHz). In this embodiment, the pattern has a length of 3.0 mm. The transmission line B12 is a line with a length of approximately ½ of the wavelength λ of the 24 GHz band. Further, in order to make impedance in the 24 GHz band larger and reduce a stray capacitance without influencing the resonance pattern B11, the line width of the transmission line B12 is narrowed to 0.1 mm.

The open stub B13 is a stub pattern with a length of approximately ¼ of the wavelength λ of the 24 GHz band. A bias Vb is supplied from the terminal 21. As a result, the bias Vb may be supplied to the base of the bipolar transistor Q1 while the open stub B13, the transmission line B12, and the resonance pattern B11 are not influenced in the 24 GHz band.

The bias Vb is switched to a level such as a low level or a high level at an arbitrary timing, and an operation of the bipolar transistor Q1 may thereby be stopped (OFF operation) or be started (ON operation). Further, a pulse operation (intermittent operation) of the bias Vb as a pulse-like voltage signal is performed, and power saving may thereby be intended.

A base current adjustment resistor and a bypass capacitor may be connected between the open stub B13 and the terminal 21.

A collector C of the bipolar transistor Q1 is electrically connected to a transmission line C11 as the second conductive film pattern 200 and a generally sector-shaped open stub C12. The transmission line C11 is a line with a length of approximately ¼ of the wavelength λ of the 24 GHz band. Further, in order to make the impedance in the 24 GHz band larger and reduce the stray capacitance, the line width of the transmission line C11 is narrowed to 0.1 mm. The open stub C12 is a stub pattern with a length of approximately ¼ of the wavelength λ of the 24 GHz band. Further, in order to widen a bandwidth of a frequency while inhibiting an increase in the stray capacitance between the open stub C12 and a neighboring conductor (in this example, an open stub E11 described later), the open stub C12 is interposed between the collector C and a power source. The open stub C12 is formed into a general sector shape for reducing the area of a portion which is adjacent to the neighboring open stub E11.

A voltage adjustment resistor C13 is joined to the mounting portion P6 between the open stub C12 and the terminal 22. Further, a bypass capacitor C14 is connected to the mounting portion P7. Another end of the bypass capacitor C14 is joined to a ground terminal G2. The ground terminal G2 is electrically connected to an internal wall of the metal casing 10 when the metal casing 10 is fitted. A power source Vc is supplied to the terminal 22. As a result, the power source Vc may be supplied to the collector C of the bipolar transistor Q1 in a state where output power in the 24 GHz band is not lowered and oscillation is stable.

An emitter E of the bipolar transistor Q1 is electrically connected to open stubs E11 and E12 as the third conductive film pattern 300, a transmission line E13 that operates as a choke coil, and an open transmission line E14 that operates as an antenna. The choke coil operates as a filter pattern that allows a direct current component to pass and cuts off a signal in a quasi-millimeter wave band.

The open stubs E11 and E12 are stub patterns for matching outputs in the 24 GHz band. In a case where one of those works sufficiently, the open stub E12 may be omitted. On the other hand, in a case where two of those do not work sufficiently, another open stub may be added. In this case, matching and adjustment are performed by the open stub E11 while the length of the open stub E12 is set to approximately ⅛ of the wavelength λ of the 24 GHz band, and the open stub E12 may thereby be caused to act as a notch filter. In such a manner, the open stub E12 is caused to act as a notch filter, harmonic components (second harmonic) may thereby be decreased. One end of the transmission line E13 (choke coil) is integrally formed with the open transmission line E14, and another end is joined to a ground terminal G1 that corresponds to a ground potential. The ground terminal G1 may be made electrically connected to the internal wall of the metal casing 10 when the metal casing 10 is fitted.

The open transmission line E14 is a conductive film pattern with a length that resonates in the 24 GHz band. An arbitrary shape may be employed for the open transmission line E14. In this embodiment, the open transmission line E14 is formed into a planar pattern in which an open end is made as long as possible so that a signal transmitted from the emitter E of the bipolar transistor Q1 is easily radiated and easily used for homodyne detection. Further, the open transmission line E14 is formed into a shape in which a portion close to the base B protrudes toward the base B so that capacitive coupling with the base B of the bipolar transistor Q1 easily occurs. The signal which is not radiated but remains (the signal reflected in the open transmission line) is enabled to be fed back to the base B of the transistor Q1 via the capacitive coupling and to contribute to oscillation. In this case, because the signal which is not radiated but remains is not likely to be input to the emitter E of the bipolar transistor Q1, the bipolar transistor Q1 may continue oscillation in a stable state.

The open end of the open transmission line E14, which is opposite to the above protruded portion, is electrically connected to cathode terminals of two mounting portions P2 and P4 at an interval d. The interval d is set to a length of approximately ⅜ of the wavelength of the 24 GHz band (in this example, 2.9 mm). The reason for this will be described later. Surface-mount of diodes D1 and D2 is performed on those mounting portions P2 and P4.

Surface-mount of the diode D1 is performed on the mounting portion P2. An anode terminal of the diode D1 is electrically connected to one end of the mounting portion P3 and the terminal 23 via an open stub D11 and a transmission line D12. Another end of the mounting portion P3 is electrically connected to the terminal 24. A bias adjustment resistor D13 is mounted on the mounting portion P3. A first output signal having subjected to detection by the diode D1 is output from the terminal 23. Further, a bias voltage Vbb is supplied to the terminal 24.

Surface-mount of the diode D2 is performed on the mounting portion P4. An anode terminal of the diode D2 is electrically connected to one end of the mounting portion P5 and the terminal 25 via an open stub D21 and a transmission line D22. Another end of the mounting portion P5 is electrically connected to the terminal 26. A bias adjustment resistor D23 is mounted on the mounting portion P5. A second output signal having subjected to detection by the diode D2 is output from the terminal 25. Further, the bias voltage Vbb is supplied to the terminal 26.

As the diodes D1 and D2, high-frequency diodes such as a mixer diode and a Schottky barrier diode may be used. Further, a base and a collector of a bipolar transistor are connected together and used as a cathode, an emitter is used as an anode, and a bipolar transistor may thereby be used as the diodes D1 and D2. Particularly, the same bipolar transistor as the bipolar transistor Q1 used as the oscillator is used as the diodes D1 and D2, only one kind of active element is thereby used, and an element procurement cost may be saved.

[Operation of High-Frequency Module]

Next, an operation of the high-frequency module 1 will be described. In the high-frequency module 1, the bipolar transistor Q1, the resonance pattern B11, and the open transmission line E14 operate as an oscillator that produces a signal in a 24 GHz band by direct oscillation. Further, the open transmission line E14 operates as an antenna that performs transmission and/or reception of the signal in the 24 GHz band. In addition, the two diodes D1 and D2 operate as mixers that perform homodyne detection of a reflected wave received by the open transmission line E14 in different positions. That is, the high-frequency module 1 operates as one electronic circuit in which standard components requested for a Doppler module are integrated together. In the following, operating principles of those components (circuits) will be described.

<Oscillator>

Figure 5:
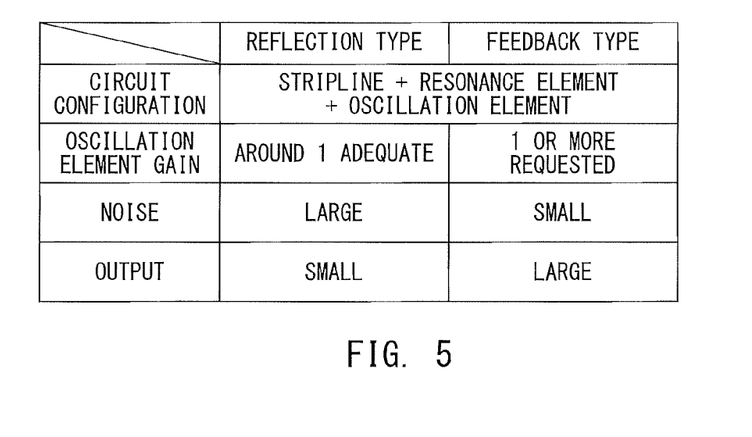
FIG. 5 is a table that illustrates characteristics of a reflection type resonator and a feedback type resonator.

As methods for realizing an oscillator in a quasi-millimeter wave band, a reflection type and a feedback type are known. FIG. 5 is a table that illustrates characteristics of both of those. As illustrated in FIG. 5, in a circuit configuration, a stripline (transmission line), a resonance element, and an oscillation element are used in both types. Although the reflection type is capable of producing oscillation with a gain of the oscillation element being around one, the feedback type requests the gain of the oscillation element to become one or more. However, the feedback type may obtain a higher output than the reflection type and thus has a large advantage that an amplifier is not requested. The feedback type also has an advantage that noise included in an output is significantly less than the reflection type.

Figure 6:
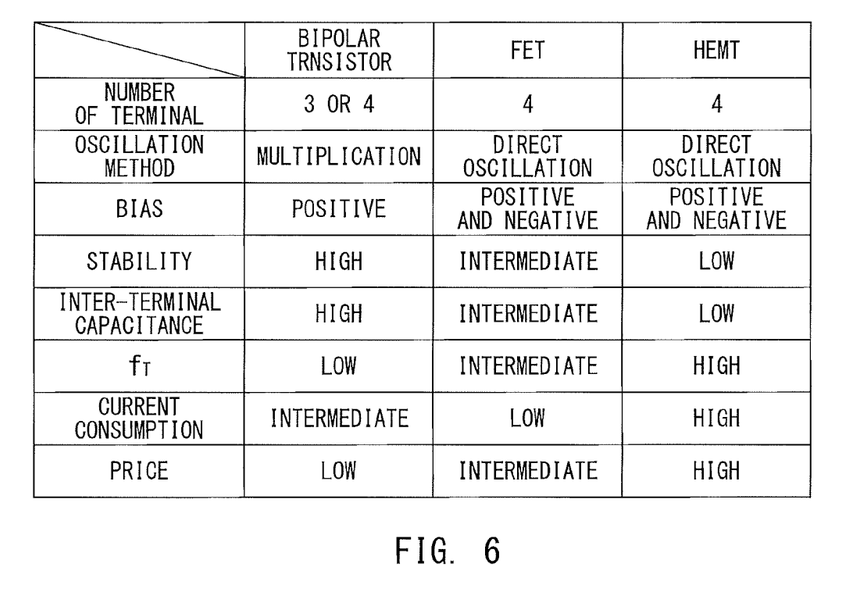
FIG. 6 is a table that illustrates characteristics of semiconductor elements used for an oscillation element.

Meanwhile, semiconductors used for an oscillation element include a bipolar transistor, a field effect transistor (FET) (unipolar transistor), and a high electron mobility transistor (HEMT), and all of those have advantages and disadvantages. FIG. 6 is a table that illustrates characteristics of those semiconductor elements. As illustrated in FIG. 6, in a high frequency band such as a quasi-millimeter wave band, a transition frequency (gain-bandwidth product) $f_T$ is an important parameter. The transition frequency $f_T$ indicates the highest frequency limit of amplification of a high frequency signal, and the HEMT has the highest transition frequency $f_T$. Further, in the oscillation element, in order to remove parasitic oscillation or resonance or move the frequency at which parasitic oscillation or resonance occurs to a higher frequency than a used frequency, an inter-terminal capacitance (that hereinafter represents a capacitance produced between terminals) should be made as small as possible. The HEMT has the smallest inter-terminal capacitance. Further, as an oscillation method, direct oscillation method is the simplest method. Thus, in the related art, the HEMT has often been used for an oscillation element of an oscillator used in a frequency band of a quasi-millimeter wave band or higher.

However, the HEMT usually uses both power sources (positive and negative biases), but because a source may not directly be grounded in a case where the HEMT uses a single power source (positive bias) in a simple configuration, for example, stability of an oscillation frequency is low, power consumption is large, and the price is high.

On the other hand, the bipolar transistor has a low transition frequency $f_T$ and more frequently causes parasitic oscillation or resonance due to the inter-terminal capacitance as the used frequency becomes higher. Thus, it is difficult to use the bipolar transistor in a quasi-millimeter wave band. Even in a case where the bipolar transistor is used in a quasi-millimeter wave band, only oscillation in a multiplication method is performed in practical use because direct oscillation is difficult. In the multiplication method, addition of an amplifier circuit occurs, and a strong filter for removal of spurious emissions should be added. Thus, as a result, size reduction and cost reduction become difficult.

Further, the inter-terminal capacitances in the bipolar transistor are an inter-terminal capacitance Ccb between the base and the collector, an inter-terminal capacitance Cce between the collector and the emitter, and an inter-terminal capacitance Ceb between the emitter and the base, and Ccb<Cce<Ceb holds. That is, the inter-terminal capacitance Ceb between the emitter and the base is largest, and this is a cause of parasitic oscillation or resonance in a high frequency band.

However, the bipolar transistor has advantages that stability of oscillation is highest, a single power source may be used as the power source, and the price is low.

In the high-frequency module 1 of this embodiment, the large inter-terminal capacitance Ceb of the bipolar transistor Q1 is turned into an advantage and used for oscillation of the feedback type. For example, a configuration is made such that the bipolar transistor Q1 uses the emitter E as an output while using a common emitter configuration in which an oscillation operation becomes stable, a signal transmitted through the open transmission line E14 but not used for radiation is fed back to the base B by the capacitance between the emitter E and the base B as terminals and the capacitance produced by capacitance coupling, and oscillation is more stably continued.

Further, a SiGe transistor, that is, a transistor in which germanium (Ge) is mixed with silicon (Si) is used as the bipolar antenna Q1, and the transition frequency $f_T$ may thereby be made higher. Thus, the signal in the 24 GHz may more stably be produced by direct oscillation.

In a simulation by the inventor, the inter-terminal capacitance Ceb is used for feedback of the signal, and as a result, influences by the other inter-terminal capacitances Ccb and Cce thereby become small. However, in the high-frequency module 1, the line widths of the transmission lines B12, C11, D12, and D22 are narrowed as much as possible (in this example, 0.1 mm), the conductive film patterns are provided in characteristic shapes and arrangement, and a stray capacitance, parasitic oscillation, or resonance is thereby prevented very carefully. For example, in the common emitter configuration, the emitter E is usually connected to an immediately adjacent ground terminal. However, in this embodiment, differently from the usual configuration, the emitter E is grounded via the open stubs E11 and E12 for matching and the transmission line E13 that operates as the choke coil. Accordingly, the stray capacitance produced between the emitter E and the ground terminal G1 may be reduced, parasitic oscillation or resonance may be inhibited, and a stable oscillation characteristic may be obtained in the 24 GHz band.

As described above, forming the open stub C12 into a general sector shape is one of measures for reducing the stray capacitance. That is, the area is reduced by narrowing a portion of the open stub C12 which is adjacent to the open stub E11, and an increase in the stray capacitance between the emitter E and the collector C is thereby inhibited.

<Antenna>

Because the size of the substrate 20 is very small as described above, the area of the open transmission line E14 is also small, and radiation efficiency is not sufficient. Thus, although the gain becomes low compared to a case where an antenna with high radiation efficiency is provided as a separate unit, the antenna, the oscillator, and the mixer described later are integrated together in the high-frequency module 1, and loss due to routing the transmission lines that connect those together is thus small. Thus, larger feeding power may be obtained than a case where the antenna is provided as a separate unit. In the simulation by the inventor, it has been found that a transmission and/or reception characteristic equivalent or higher than a product of the present applicant in which an antenna is provided as a separate unit may be obtained.

The high-frequency module 1 uses only the open transmission line E14 as an antenna. That is, the high-frequency module 1 is used as a one-antenna type module. In a case of a Doppler module, a two-antenna type is the mainstream in the related art because matching and phase adjustment are ordinarily easy. However, in a case of the two-antenna type, coupling between antennas occurs when the interval between the antennas is shortened for size reduction, and resolution is lowered due to this coupling. Further, a Doppler module in the related art, even of the one-antenna type, requests a distribution unit (branching unit) and the like, and the area is enlarged due to a complicated circuit. In a case where a circulator, isolator, and the like suitable for size reduction are used, enlargement of the area may be avoided, but those components take high costs. The high-frequency module 1 of this embodiment does not use expensive components and thus has an advantage in cost while inhibiting lowering of resolution.

<Mixer>

The mixer is configured with the open transmission line E14 and the two diodes D1 and D2 connected to the open transmission line E14. While the power Vc is supplied to the collector C and the bias voltage Vb is input to the base B, the signal which is produced by direct oscillation in the resonance pattern B11 and transmitted through the emitter E flows into the open transmission line E14 and is continuously radiated. The radiated signal is reflected by an object and received as a reflected wave by the open transmission line E14.

In the following description, the radiated signal will be referred to as a "radiated signal", and the signal received as a reflected wave will be referred to as a "reflected signal".

The signal produced by direct oscillation (the same as the radiated signal) and the reflected signal are input to the diodes D1 and D2 through the open transmission line E14, and homodyne detection is performed. The signals that result from homodyne detection become Doppler signals for discriminating the moving direction of a moving object and are output from the terminals 23 and 25. That is, when the object moves closer to or away from the high-frequency module 1, Doppler signals phases of which change in response to the movement velocity of the moving object are output from the diodes D1 and D2 by the Doppler effect of a radio wave. In the following, a signal that results from homodyne detection by the diode D1 and is output from the terminal 23 will be referred to as a first Doppler signal, and a signal that results from homodyne detection by the diode D2 and is output from the terminal 25 will be referred to as a second Doppler signal.

Given that the wavelength of the radiated signal is $\lambda$ (the same applies to the reflected signal), the distance between the object and the open transmission line E14 is L (vector quantity), and the amplitude of a signal waveform is A, an oscillation angular frequency is $\omega$, a radiated signal $V_{T1}$ and a reflected signal $V_{R1}$ that are input to the diode D1 and a first Doppler signal $V_{M1}$ are expressed by the following formulas.

$V_{T1} = A_{T1} \sin(\omega t + \theta_{T1})$ $V_{R1} = A_{R1} \sin(\omega t + \theta_{R1} + 4\pi L/\lambda)$ $V_{M1} = A_{M1} \sin(\theta_{T1} - \theta_{R1} - 4\pi L/\lambda)$ In a similar manner, a radiated signal $V_{T2}$ and a reflected signal $V_{R2}$ that are input to the diode D2 and a second Doppler signal $V_{M2}$ are expressed by the following formulas.

$V_{T2} = A_{T2} \sin(\omega t + \theta_{T2})$ $V_{R2} = A_{R2} \sin(\omega t + \theta_{R2} + 4\pi L/\lambda)$ $V_{M2} = A_{M2} \sin(\theta_{T2} - \theta_{R2} - 4\pi L/\lambda)$ Each phase difference $\theta$ satisfies the following conditional expressions.

$\theta_{T1} < \theta_{T2}, \theta_{R1} < \theta_{R2}$, and $(\theta_{T1} - \theta_{R1}) \neq (\theta_{T2} - \theta_{R2})$ Thus, the phase difference $\theta$ between the first Doppler signal $V_{M1}$ and the second Doppler signal $V_{M2}$ is expressed by the following formula.

$\theta = (\theta_{T2} - \theta_{R2}) - (\theta_{T1} - \theta_{R1})$

The above conditional expressions are satisfied by connecting the diodes D1 and D2, at the interval d, with the open end opposite to the protruded portion of the open transmission line E14, and the Doppler signals with a phase difference of 0 may be output.

Figure 7A:
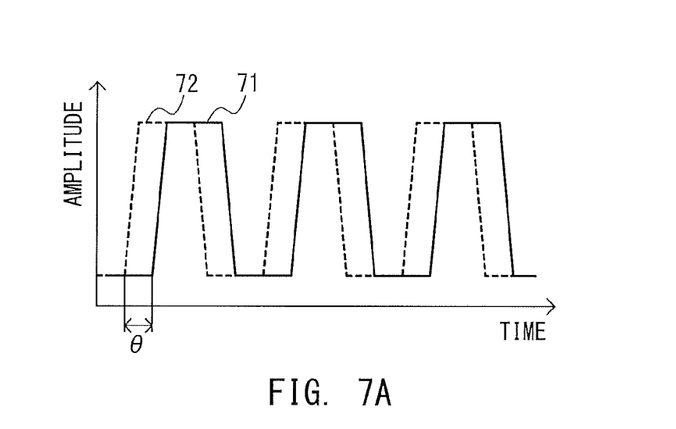
FIG. 7A illustrates signal waveform examples of two Doppler signals and an example where an object moves closer.
Figure 7B:
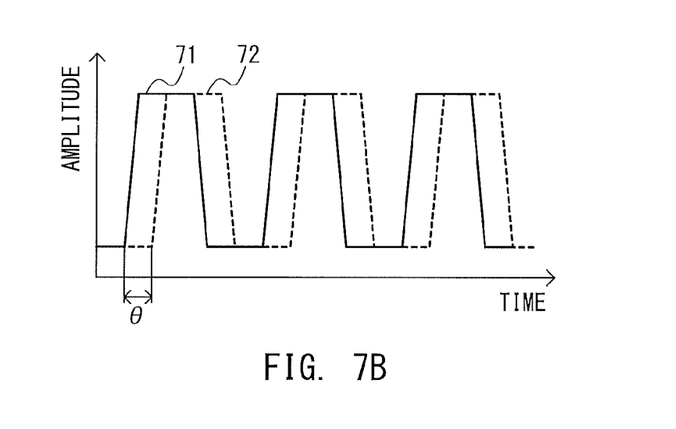
FIG. 7B illustrates signal waveform examples of the two Doppler signals and an example where an object moves away.

Waveforms examples of the first Doppler signal $V_{M1}$ and the second Doppler signal $V_{M2}$ in a case where a moving object moves closer to or away from the high-frequency module 1 at a constant velocity are illustrated in FIG. 7A and FIG. 7B. FIG. 7A illustrates an example of moving closer, and FIG. 7B illustrates an example of moving away. As illustrated in FIG. 7A, when the object moves closer, a first Doppler signal ($V_{M1}$) 71 is delayed from a second Doppler signal ($V_{M2}$) 72 by the phase difference $\theta$. Further, as illustrated in FIG. 7B, when the object moves away, the second Doppler signal ($V_{M2}$) 72 is delayed from the first Doppler signal ($V_{M1}$) 71 by the phase difference $\theta$. Thus, the moving direction of a moving object may be discriminated by detecting the phase difference $\theta$ of the signal waveform and a phase shift direction (phase delay or phase advance) of the second Doppler signal ($V_{M2}$) 72 with respect to the signal waveform of the first Doppler signal ($V_{M1}$) 71 as a reference, for example.

A process for detecting the phase difference $\theta$ or the like between the first Doppler signal ($V_{M1}$) 71 and the second Doppler signal ($V_{M2}$) 72 is executed by an analog-to-digital converter and a digital signal processor (DSP) that are incorporated in a predetermined housing together with the high-frequency module 1 and a power source unit.

By a simulator of the inventor, the phase difference $\theta$ in a case where the moving velocity of a moving object is set constant is 265° (degree angle). This is because the interval d between the diodes D1 and D2 is set to a length of approximately ⅜ of the wavelength $\lambda$ of the frequency of the 24 GHz band (in this example, 2.9 mm). Taking into consideration non-uniformity of the velocity of movement of a moving object, the phase difference $\theta$ desirably becomes approximately 270° ($3\pi/2$). However, in practical use, sufficient direction discrimination performance for a moving object may be obtained in a range of 235° to 315°.

<Metal Casing>

Figure 8:
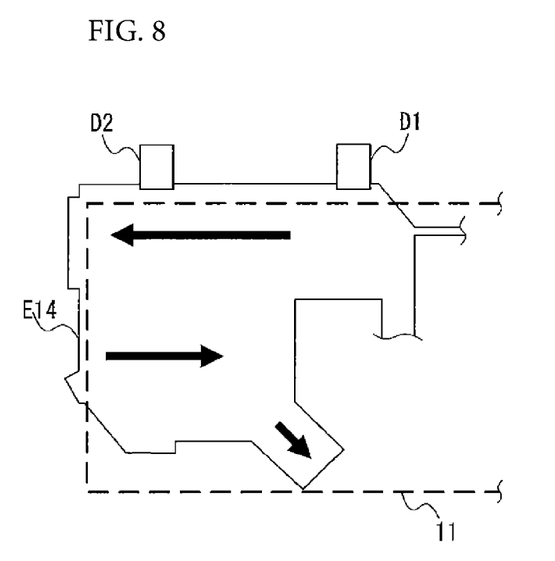
FIG. 8 is a diagram that illustrates the positional relationship between a front surface of the substrate and a window.
Figure 9A:
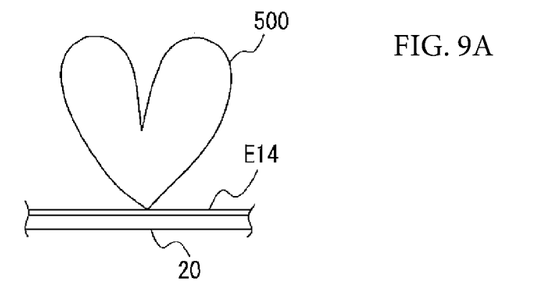
FIG. 9A illustrates a beam pattern in a case where no metal casing is present.
Figure 9B:
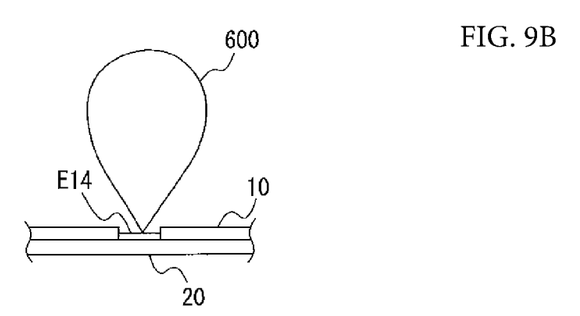
FIG. 9B illustrates a beam pattern in a case where a metal casing is present.

Next, functions of the metal casing 10 and the window 11 will be described. FIG. 8 is a diagram that illustrates the positional relationship between the front surface of the substrate 20 and the window 11. As indicated by arrows in FIG. 8, the signal propagating through the open transmission line E14 propagates from a feeding side, turns back at the open end opposite to the feeding side, and again turns back at the open end on the feeding side. A portion of the signal propagates in a direction toward the base B of the bipolar transistor Q1 and turns back at the open end. In such a manner, transmission directions of the signal in the open transmission line E14 are complicated. Thus, the radiation direction of the signal is distorted, and this results in a state where a beam 500 is divided into two portions as illustrated in FIG. 9A. Then, the rectangular window 11 is formed along a periphery of the open end of the open transmission line E14 except the feeding side, reactance is thereby loaded in the open end of the open transmission line E14. The reactance loaded in the open transmission line E14 is made variable, the phase of the signal propagating from the open end is thereby optimized, and a beam is caused to be formed in one direction. FIG. 9B illustrates an example of a beam pattern radiated from the window 11 and a situation in which a beam 600 is formed in the orthogonal direction to the open transmission line E14.

The diodes D1 and D2, the bipolar transistor Q1, and portions of the other conductive film patterns are covered (shielded) by the metal casing 10. Thus, stabilization of operations of the oscillator and homodyne detection may be intended.

Figure 10:
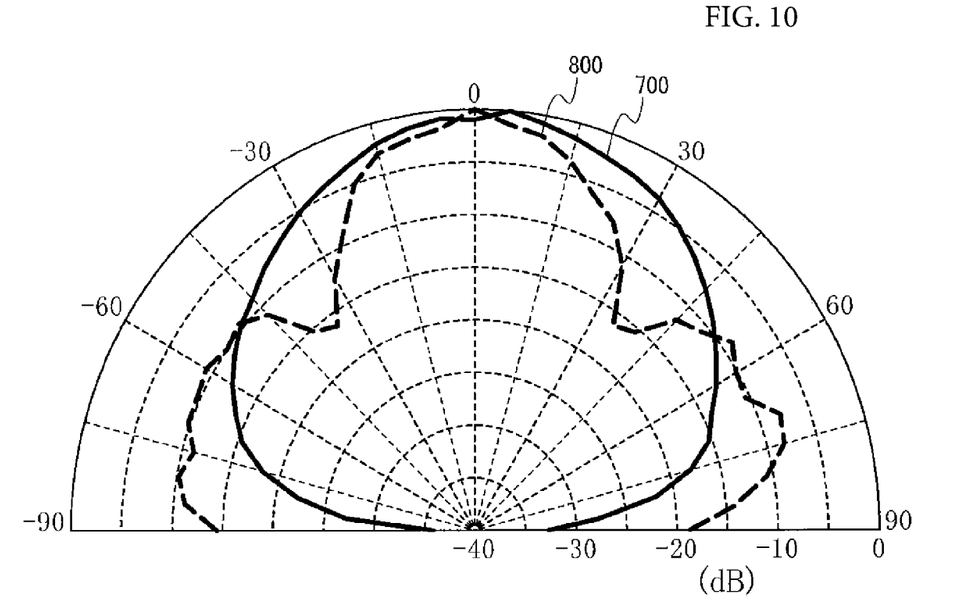
FIG. 10 is a radiation characteristic diagram of the high-frequency module of this embodiment.

FIG. 10 is a measured drawing of beam patterns radiated from the window 11 of the metal casing 10. The solid line indicates a beam pattern in a long-side direction of the metal casing 10 (horizontal direction pattern), and the broken line indicates a beam pattern in a short-side direction of the metal casing 10 (vertical direction pattern). In a case where the perpendicular direction from a central portion of the window 11 is set as 0°, a beam pattern in the vertical direction has a peak at 0°. Although a peak of the horizontal direction pattern is slightly offset from the central portion of the window 11, this is considered to be due to the window 11 is formed into a rectangular shape. A peak gain is 1 dBi in each pattern. The half-band width is 50° in the horizontal direction pattern and is 30° in the vertical direction pattern, and a sufficient radiation characteristic for use in a short distance sensor is obtained. Fine adjustment of a beam pattern is possible by changing the shape of the window 11.

Further, a plano-convex lens configured with a dielectric body may easily be loaded in a manner such that the lens covers the window 11 of the metal casing 10. Thus, a beam pattern may largely be narrowed by a reasonable configuration, and application to a long distance sensor is possible.

<Other Electrical Performance>

As for the high-frequency module 1 of this embodiment, the maximum value of effective isotropic radiated power (EIRP) is +10 dBm, the maximum value per degree Celsius (° C.) of frequency drift that indicates oscillation stability is 0.8 MHz, and the maximum value of power consumption is 30 mA in continuous use. Further, the operable temperature range is from −30° C. to +85° C.

In such a manner, this embodiment may realize the high-frequency module 1 that has sufficient electrical performance in use of both of indoor environment and outdoor environment while being very small-sized and having a low profile.

The high-frequency module 1 may be used as a radio wave sensor (Doppler module) for detecting the moving velocity and the moving direction of an object such as a person, an animal, or a vehicle by using the Doppler effect of a radio wave and may be used as a physical body sensor that senses presence or absence of an object. Thus, the high-frequency module 1 may be installed in various electronics-applied apparatus and may contribute to diversification of fields of use of electronics-applied apparatus.

Modification Examples

In this embodiment, a description is made about an example where an NPN type bipolar transistor is used as a three-terminal transistor. However, a transistor is not limited to this. In a case where even in a four-terminal transistor in which two terminals form emitters (which is configured with two emitter terminals, one collector terminal, and one base terminal), one of the emitter terminals is made an open terminal and where the other terminal is connected to an open transmission line, the four-terminal transistor may be used in a similar manner to a three-terminal transistor. The emitter terminals are connected together by the shortest pattern and may thereby be used as one terminal. Further, a configuration may be made by using another transistor than a bipolar transistor, for example, a field effect transistor (FET). In this case, in a case where even in a four-terminal transistor (configured with two source terminals, one drain terminal, and one gate terminal), one of the source terminals is made an open terminal and where the other terminal is connected to an open transmission line, the four-terminal transistor may be used in a similar manner to a three-terminal transistor.

The present invention has one of characteristics in a point that a resonance pattern that outputs a signal at a frequency in a quasi-millimeter wave band or higher by direct oscillation is connected to a first terminal as one of two terminals having an inter-terminal capacitance of a transistor is relatively large, a planar open transmission line that operates as an antenna is connected to a second terminal as the other of the two terminals, and a portion of the signal which is transmitted through the open transmission line when a power source is supplied to a third terminal other than the above two terminals is fed back to the first terminal via a capacitance which is produced by a capacitance between the first terminal and the second terminal, that is, an inter-terminal capacitance between the first terminal and the second terminal and capacitance coupling between the first terminal and the open transmission line. Thus, a transistor of any kind or grounding type may be used as long as a semiconductor element has at least three terminals. Further, a unipolar transistor, for example, a field effect transistor may be used.

Further, in this embodiment, a description is made about an example of the high-frequency module 1 in which the oscillator, the antenna, and the mixer are integrated together. However, a high-frequency module with an oscillator and an antenna or only with an oscillator may be configured. Further, in this embodiment, a description is made about an example where transmission and/or reception of a signal in a 24 GHz band is performed. However, this embodiment is applicable to signals at other frequencies in quasi-millimeter wave bands.

The invention claimed is:

1. A high-frequency module comprising:
a transistor that has a first terminal, a second terminal, and a third terminal;

a resonance pattern which is connected to the first terminal and outputs a signal at a frequency in a quasi-millimeter wave band or higher by direct oscillation;

a filter pattern having one end connected to the second terminal; and an open stub for matching which is interposed between the second terminal and the filter pattern, wherein another end of the filter pattern is grounded; and a planar open transmission line which is connected to the second terminal and operates as an antenna capable of transmission and/or reception of a signal at the frequency, wherein:

the open transmission line causes capacitance coupling with the first terminal, an inter-terminal capacitance between the first terminal and the second terminal is larger than an inter-terminal capacitance between the first terminal and the third terminal and an inter-terminal capacitance between the second terminal and the third terminal, and in a case where a power source is supplied to the third terminal, a portion of the signal which is transmitted through the open transmission line is fed back to the first terminal via a capacitance between the first terminal and the second terminal.

2. The high-frequency module according to claim 1, further comprising:

an open stub which is interposed between the third terminal and the power source, wherein:

the open stub widens a bandwidth of the frequency in the quasi-millimeter wave band or higher while inhibiting an increase in a stray capacitance between the open stub and a neighboring conductor.

3. The high-frequency module according to claim 1, wherein:

the open transmission line radiates the signal and receives a reflected wave of the signal which is reflected by an object.

4. The high-frequency module according to claim 3, further comprising:

two diodes that are connected to an open end of the open transmission line and perform homodyne detection of the reflected wave in different positions.

5. The high-frequency module according to claim 4, wherein:

the two diodes are configured with the transistors in each of which two terminals are connected together.

6. The high-frequency module according to claim 1, wherein:

the transistor is a three-terminal transistor.

7. The high-frequency module according to claim 1, wherein:

the transistor is a four-terminal transistor in which two terminals are formed as emitters or sources, has one of the emitter or source terminals as an open terminal, and is configured as a three-terminal transistor.

8. A high-frequency module comprising:

a substrate;

a plurality of conductive film patterns that are formed on a front surface of the substrate; and a bipolar transistor which is mounted on the substrate and has an emitter, a collector, and a base, wherein:

the plurality of conductive film patterns include:

a first conductive film pattern which is electrically connected to the base and includes a resonance pattern, the resonance pattern outputting a signal at a frequency in a quasi-millimeter wave band or higher by direct oscillation;

a second conductive film pattern which is electrically connected to the collector and connected to a power source; and a third conductive film pattern which is electrically connected to the emitter and includes a grounded filter pattern and a planar open transmission line, the planar open transmission line operating as an antenna capable of transmission and/or reception of the signal at the frequency in the quasi-millimeter wave band or higher and constituting capacitance coupling with the base, wherein:

the bipolar transistor comprises a first terminal and a second terminal, the grounded filter pattern has one end connected to the second terminal of the bipolar transistor, and an open stub is interposed between the second terminal and the grounded filter pattern, the planar open transmission line causes capacitance coupling with the first terminal, and a portion of the signal transmitted through the open transmission line is fed back to the base via a capacitance produced by an inter-terminal capacitance between the emitter and the base and the capacitance coupling.

9. The high-frequency module according to claim 8, wherein:

the open transmission line is formed in a size that enables radiation of the signal at the frequency in the quasi-millimeter wave band or higher and reception of a reflected wave resulting from reflection of the signal by an object, two diodes are connected to an open end of the open transmission line at a predetermined interval, and each of the diodes outputs a Doppler signal that enables discrimination of a moving direction of the object by performing homodyne detection of the reflected wave in a different phase.

10. The high-frequency module according to claim 9, wherein:

the first conductive film pattern and the second conductive film pattern are patterns in which impedance at the frequency of the signal becomes larger than impedance at other frequencies.

11. The high-frequency module according to claim 10, wherein:

the second conductive film pattern includes an open stub, the open stub having a narrow portion opposite to the first conductive film pattern or the third conductive film pattern and becoming wider as separated from the first conductive film pattern and the third conductive pattern.

12. The high-frequency module according to claim 9, wherein:

the second conductive film pattern includes an open stub, the open stub having a narrow portion opposite to the first conductive film pattern or the third conductive film pattern and becoming wider as separated from the first conductive film pattern and the third conductive pattern.

13. The high-frequency module according to claim 8, wherein:
the first conductive film pattern and the second conductive film pattern are patterns in which impedance at the frequency of the signal becomes larger than impedance at other frequencies.

14. The high-frequency module according to claim 13, wherein:
the second conductive film pattern includes an open stub, the open stub having a narrow portion opposite to the first conductive film pattern or the third conductive film pattern and becoming wider as separated from the first conductive film pattern and the third conductive pattern.

15. The high-frequency module according to claim 8, wherein:
the second conductive film pattern includes an open stub, the open stub having a narrow portion opposite to the first conductive film pattern or the third conductive film pattern and becoming wider as separated from the first conductive film pattern and the third conductive pattern.

\* \* \* \* \*